Figure 1:
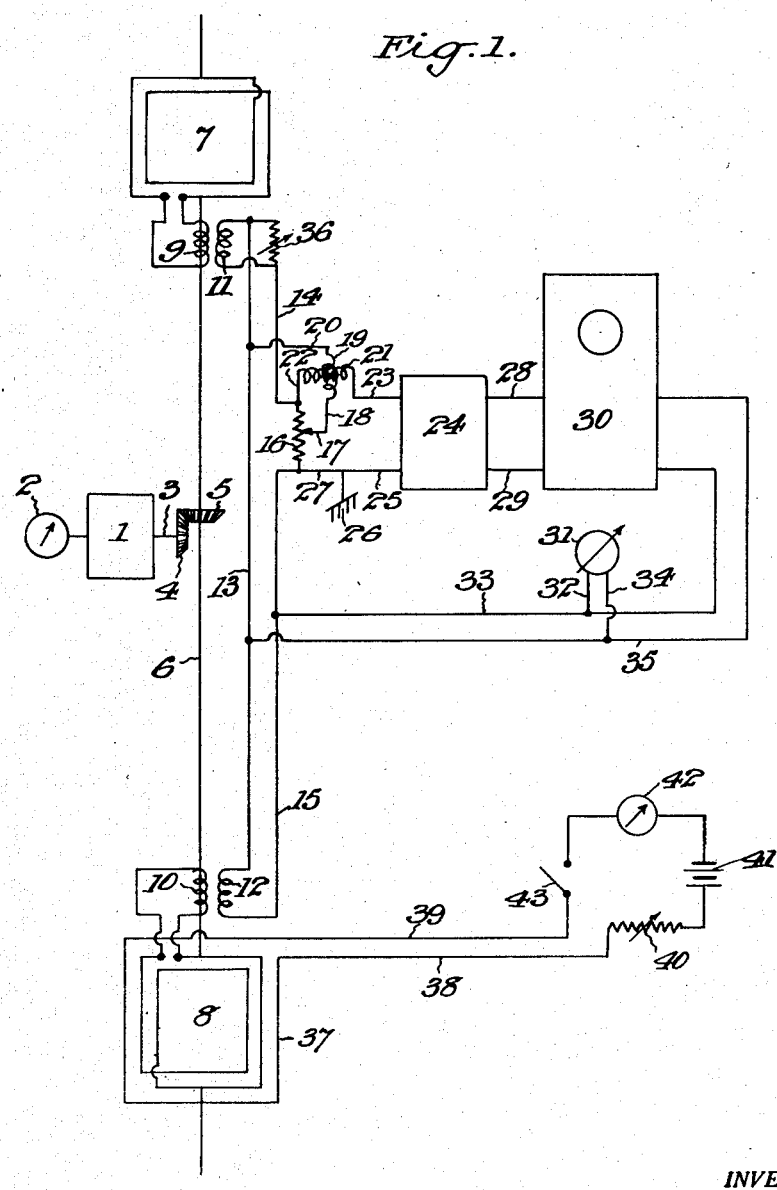

Aug. 15, 1950     T. ZUSCHLAG     2,519,094
APPARATUS FOR DETECTING MAGNETIC DISTURBANCES
Filed Oct. 30, 1945     2 Sheets-Sheet 1

INVENTOR.
Theodore Zuschlag
BY
his attorney

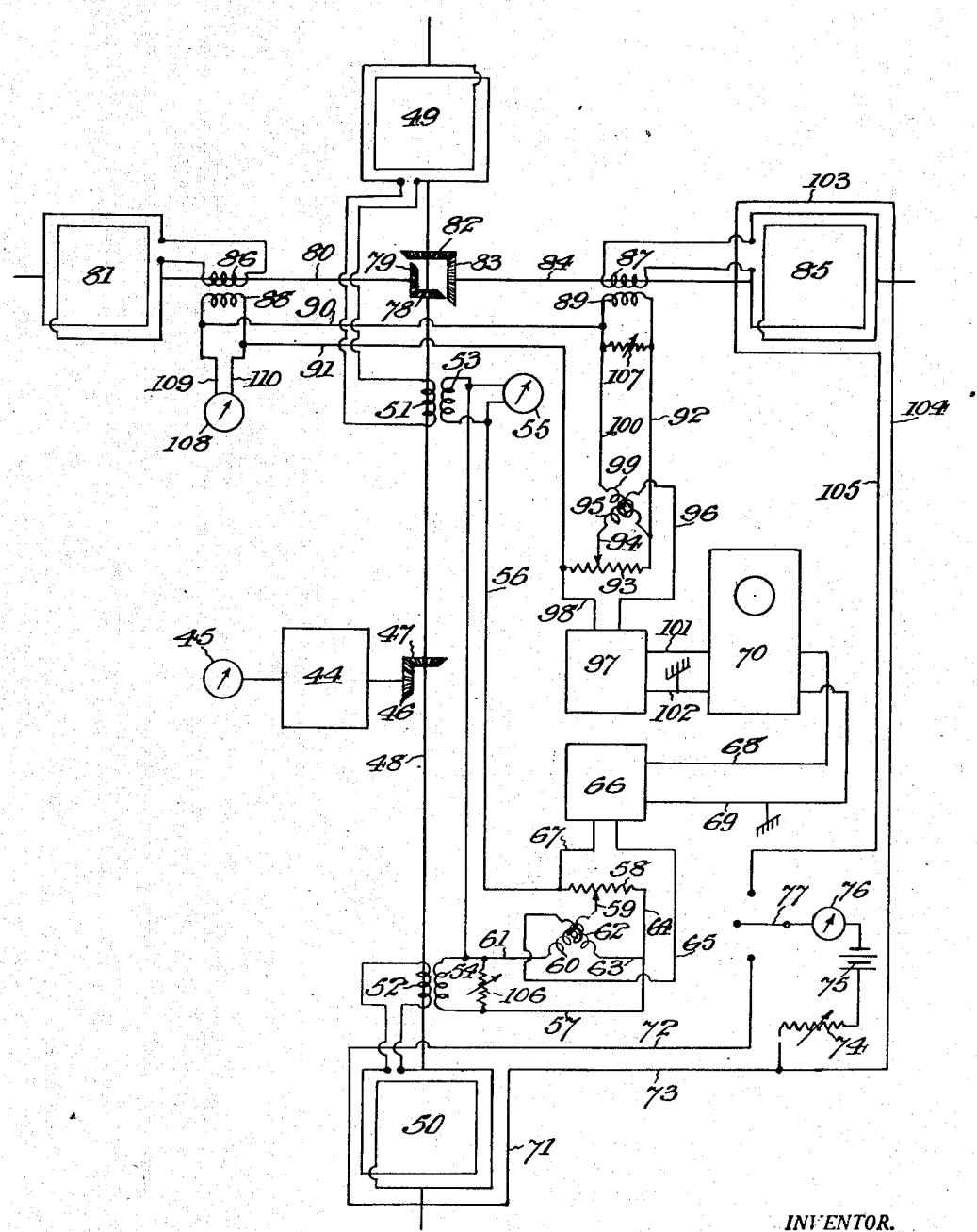

Patented Aug. 15, 1950

2,519,094

UNITED STATES PATENT OFFICE 2,519,094

APPARATUS FOR DETECTING MAGNETIC DISTURBANCES

Theodore Zuschlag, West Englewood, N. J., assignor, by mesne assignments, to Lundberg Explorations Limited, Toronto, Ontario, Canada, a corporation of Ontario Application October 30, 1945, Serial No. 625,589

3 Claims. (Cl. 175—183)

This invention relates to apparatus for and method of detecting magnetic disturbances, and has for an object to provide an apparatus and method for detecting and locating magnetic masses including those which have only a slight effect upon the intensity of the earth's natural magnetic field.

Another object is to provide such an apparatus and method for detecting and locating the magnetic masses by determining their effect upon the normal distribution of the earth's magnetic field in relation to its intensity at different coordinates spaced perpendicularly from each other.

Another object is to provide such an apparatus and method for accomplishing the last named object while said coordinates are moving.

Another object is to provide such an apparatus and method for detecting and locating the magnetic masses through the use of alternating current measurement technique with particular relation to amplitude and phase determinations on a ratio or differential basis.

Another object is to provide such an apparatus and method capable of reacting to the magnetic effects with extreme sensitivity even when mounted on a moving support such, for example, as an air or water craft.

Another object is to provide such an apparatus and method capable of operating independently of diurnal variations and accurate coordinate displacement, while also providing for phase correction.

Another object is to provide such an apparatus which, while of maximum sensitivity, is rugged in construction, and is of extreme reliability.

A further object consists in providing certain improvements in the form, construction, arrangement and material of the several parts, and in the steps of the method, whereby the above named and other objects may be effectively attained.

Practical embodiments of the invention are shown in the accompanying drawings, in which:

Fig. 1 represents a diagrammatic arrangement or layout of the apparatus or instrument; and Fig. 2 represents a diagrammatic layout or arrangement in which two instruments similar to that shown in Fig. 1 are combined for the purpose of obtaining certain additional results.

It is known to those skilled in this art that the presence of any magnetic mass causes a change in the normal distribution of the earth's natural magnetic field with respect to the intensity of the field in three perpendicular coordinates spaced from each other even though the spacing is slight. The amount of the change or distortion varies along with the effective strength of the magnetic mass, decreases with increase in the distance at which the mass is located, and is modified by differences in the spacing between successive coordinate points.

Advantage can be taken of the facts just stated not only for the purpose of detecting the presence of magnetic masses but also for indicating their location with respect to arbitrarily selected coordinate points either fixed or moving. Previous efforts looking toward the production of an apparatus or instrument fitted to accomplish the last named result have brought forth several at least partially successful when operating in connection with fixed coordinate points, but it is believed that only one type of apparatus or instrument has heretofore been devised that is adaptable to the just stated form of exploration in connection with moving coordinate points. The last named instrument may be identified as a differential earth inductor which was described by H. Haalck, in Zeitschrift für Technische Physik, 1925–6, pp. 377–380; and later on set forth in a modified form, as a magnetic gradiometer, by Irwin Roman and Thomas C. Sermon in A. I. M. E. Geophysical Prospecting published in 1934. These two instruments were not, however, capable of taking advantage of the present alternating current measurement technique; they lacked adequate sensitivity for the purposes of the present invention; they were not adapted to accurate or efficient exploration when mounted on a moving support; they did not provide for phase correction; they were deficient in structural features such, for instance, as the avoidance of contact potential effects, as well as with respect to durability and reliability; and, in general, were not sufficiently developed and perfected so as to be practically useful in conducting the investigations contemplated by the present invention, especially in the light of present day conditions and requirements as to accuracy, speed, comprehensiveness and efficiency.

Referring to the form of apparatus shown in Fig. 1 of the dawings, a suitable well shielded electric motor 1 is provided with a tachometer 2, and its drive shaft 3 carries a bevel gear 4 which meshes with another gear 5 that is fixed on a shaft 6 which has its ends in driving connection with rotatable coils 7 and 8 that are similar in construction, area and number of turns of their windings. The shaft 6 should be of non-ferrous material and light in weight, as by making it hollow, while the coils 7, 8 should be fixed thereon, as by set screws, so that their spacing from each other may be varied. Transformer primaries 9 and 10 are fixed on the shaft 6 and are connected respectively to the coils 7 and 8, preferably through the hollow shaft 6, while their stationary secondaries 11 and 12 are connected in series opposition by a wire 13. The arrangement just described avoids sliding contacts between the rotatable coils 7, 8 and the stationary transformer secondaries 11, 12, which eliminates the difficulties frequently encountered in connection with sliding contact or brush devices.

The differential outputs of the said transformer secondaries are connected by wires 14, 15 with a potentiometer 16 that has its slider 17 connected in series by a wire 18 with the stator 19 of a variometer, and by a wire 20 with the common connection 13 of the two transformer secondaries 11, 12. The rotor 21 of the variometer is connected by wire 22 with the ungrounded terminal of potentiometer 16 and by wire 23 with the ungrounded input terminal of an amplifier 24, which has its other input terminal grounded by a wire 25, as indicated at 26. One end of potentiometer 16 is also grounded at the same point by a wire 27.

The output terminals of amplifier 24 are connected by wires 28, 29 with the input of a cathode ray oscilloscope 30, which should preferably be electrically synchronized by the voltage developed across the secondary of transformer 10, 12 as measured by a sensitive voltmeter 31, which latter has one terminal connected by wire 32 with another wire 33 that is in turn connected with one input terminal of the oscilloscope 30 and also with the wire 15; while the other terminal of said voltmeter is connected by a wire 34 with another wire 35 that leads to the other input terminal of the oscilloscope 30 and to the wire 13. For the purpose of balancing the shunting effect of the oscilloscope 30 and the voltmeter 31, a shunt resistance 36 is connected across the secondary of transformer 9, 11.

The coil 8 is surrounded by a stationary calibration coil 37 having only a few turns of wire which is connected by wires 38 and 39 in series with an adjustable resistance 40, a battery 41, a milliammeter 42 and a circuit switch 43. The calibration setup just described is normally not energized, because the switch 43 is normally open as indicated in the drawing; but the closing of the said switch will cause a current to flow from the battery 41 through the calibration coil 37, the strength of which current will be shown by the milliammeter 42 and can be varied to the desired value by appropriate adjustment of the resistance 40. It may here be observed that the change in field strength effected by the current flow just named is approximately indicated by the expression $dH = C \times I$, if $dH$ is taken as the change in the effective value of the field; $I$ is taken as the current in milliamperes; and $C$ is taken as a constant which is determined by and varies with the diameter, arrangement, and number of turns of the calibrating coil 37.

Referring generally to the operation of this apparatus, it may be noted that the driving power is preferably applied by the motor 1 to the shaft 6 at a point located midway between the coils 7 and 8 in order to avoid uneven torque and torsional factors. The electromotive force induced in each rotating coil is approximately reflected by the equation $$E.\,M.\,F. = \frac{\pi}{2} d^2 n r f 10^{-8}$$

volts, where $d$ is taken as the mean diameter of each coil in centimeters; $n$ is taken as the number of turns in each coil; $r$ is taken as the number of coil rotations per second; and $f$ is the maximum field strength at right angles to the plane of rotation measured in Gauss. To illustrate, if $d = 50$ cm., $n = 2000$ turns, $r = 25$ R. P. S., and $f = .2$ Gauss, the result will be an E. M. F. of approximately .4 volt. If now it be assumed that the intensity of the earth's magnetic field differs by 2 gammas at the locations of the two rotating coils, the differential output of which is supposedly perfectly balanced, the resultant differential E. M. F. is $1/10{,}000$ of .4 volt or, in other words 40 microvolts.

Under present conditions of development in the art of electronics, it is feasible to amplify and indicate as small a strength as .4 microvolt by the use of portable equipment; which means that the differential earth inductor hereinabove described is capable of indicating differences in the earth's magnetic field as low as .02 gamma and, possibly, even smaller values with appropriate changes in the design of the coils, e. g. diameter, number of wire turns, and rotative speed. However, such extreme reactive sensitivity would hardly be called for in ordinary geophysical exploration due to lack of sufficient uniformity in the earth's normal magnetic field; although the observation and recording of such minute changes in strength or value is useful in operation over very uniform areas, such as bodies of water, where this very sensitive equipment would enable the detection of ships or other magnetic bodies on or below the water's surface. For geophysical purposes it is practical, and probably desirable, to reduce the sensitivity of this apparatus, e. g. by decreasing diameter, turns, or speed of rotation of the coils, so that its conspicuous and characteristic advantages accord with the conditions surrounding such operations; and it may be remarked that the equipment is not only highly suitable for geophysical observations in general but that it has particular aptitude in connection with the continuous recording on aerial exploration flights of the effects of magnetic anomalies in the ground covered by the flights.

In operation, if it is desired to use the apparatus for detecting the presence of slight variations in the normal earth magnetic field, it may be mounted vertically with the coils 7 and 8 about, say, from six to fifteen feet apart. The actual speed of rotation of the coils is not a matter of importance in connection with the measurements to be made, except that it should not be allowed to become so slow as to fail to maintain a sufficient voltage input. With the coils rotating at a normal speed of say approximately fifteen revolutions per second there should appear on the screen of the oscilloscope 30 a representation of a tilted ellipse which can be changed to a straight line by suitable manipulation of the potentiometer 16 and variometer 19, 21. If this last named step be taken while the calibration coil 37 is disconnected from its source of energy because the switch 43 is open, the closing of the said switch will superimpose an auxiliary magnetic field of arbitrary value upon the coil 37 and this will have a tendency again to produce an elliptical figure on the oscilloscope which may be either in vertical or tilted position. The degree of distortion of this figure on the screen is a measure of the strength of the auxiliary field established by the coil 37 and, as such, may be used to calibrate the apparatus.

Thereafter, upon reopening the switch 43 and moving the instrument over the ground area under investigation, the pattern or figure or picture on the oscilloscope screen will remain in the form of a straight line as long as the value of the earth's magnetic field remain uniform. If, however, the said magnetic field changes its value within the limits of the detection sensitivity of the apparatus, the straight line representation on the oscilloscope screen will instantly change, thus indicating a variation in the field caused by the presence of a magnetic mass, while the character of the change may be interpreted as to its practical geophysical meaning by an operator skilled in this art. In this connection, it may be mentioned that the oscilloscope could be replaced by a continuous recording device such, for instance, as Brush recording galvanometer, whereby a permanent record would be made of the magnetic changes in the earth's field encountered during a trip or trips over the ground area being explored.

Referring now to the apparatus shown in Fig. 2 of the drawings, it is pointed out that this equipment is of especial value when it is desired not only to detect the presence, but also to receive indications as to the approximate location, of a magnetic mass or anomaly. This apparatus, in general, represents two instruments similar to that shown in Fig. 1, which are arranged at right angles to each other in a horizontal plane and with one of the drive shafts oriented in the direction of movement of the apparatus over the area under investigation.

In this form of the apparatus, the motor is denoted by 44 and its tachometer by 45. Bevel gears 46 and 47 enable the motor to drive a shaft 48 which corresponds substantially with shaft 6 of the form shown in Fig. 1 and has its extremities connected to coils 49 and 50 for rotating them. Primaries 51, 52 of transformers are fixed on the shaft 48 for rotation therewith, and are connected respectively to the coils 49 and 50, preferably through the hollow shaft 48, while their stationary secondaries 53, 54 are connected in series opposition. Secondary 53 is connected with a sensitive voltmeter 55, and the differential outputs of both secondaries are connected by wires 56, 57 with a potentiometer 58 which has its slider 59 connected in series with the stator 60 of a variometer and, by wire 61, with the common connection of the transformer secondaries 53, 54. The rotor 62 of the variometer is connected through wires 63, 64 with one terminal of the potentiometer 58, and by a wire 65 with one input terminal of an amplifier 66 which has its other input terminal connected by wire 67 with the other terminal of potentiometer 58. The output terminals of amplifier 66 are connected by wire 68 and grounded wire 69 with the input terminals of a cathode ray oscilloscope 70.

A calibration coil 71 surrounds the rotating coil 50 and is connected by wires 72, 73 in series with an adjustable resistance 74, a battery 75, a milliammeter 76, and a single pole double throw circuit switch 77.

The drive shaft 48 is connected by bevel gears 78, 79 with a drive shaft 80 that serves to rotate a coil 81; and shaft 48 is also connected by bevel gears 82, 83 with another shaft 84 which is in driving connection with a coil 85 for rotating the same. This arrangement causes the coils 81 and 85 to be rotated in the same direction. Rotating primaries 86, 87 of transformers are mounted on shafts 80 and 84 respectively and are connected to coils 81 and 85, preferably through hollow shafts 80, 84.

The fixed secondaries 88, 89 of said transformers are connected in series opposition by a wire 90, and have their differential outputs connected by wires 91, 92 with another potentiometer 93, the slider 94 of which is connected in series with the stator 95 of a variometer and by wire 96 with one input terminal of another amplifier 97, the other input terminal of which is connected by a wire 98 with a terminal of the potentiometer 93. The rotor 99 of the variometer is connected to the wire 92 and also, by a wire 100, with the common connection 90 of the transformer secondaries 88, 89; while the output terminals of the amplifier 97 are connected by wire 101 and grounded wire 102 with the input of the oscilloscope 70. Another calibration coil 103 surrounds the rotating coil 85 and is connected by wires 104 and 105 in series with the adjustable resistance 74 and the switch 77.

Adjustable resistances 106 and 107, which have functions similar to the function of resistance 36 in the form of apparatus shown in Fig. 1, are connected respectively between wires 57, 61 and 92, 100; and a sensitive voltmeter 108, similar in purpose to the meter 31 in the form of apparatus shown in Fig. 1, is connected by wires 109 and 110 to the transformer secondary 88 and to the wires 90, 91.

From the foregoing description it will be clear that the horizontal plates of the oscilloscope 70 can be energized by the output of amplifier 66, while the vertical plates are energized by the output of amplifier 97. As the switch 77 is of the single pole double throw type, it can be used for the purpose of energizing either the calibration coil 71 or the calibration coil 103.

The principle and mode of operation of the apparatus shown in Fig. 2 is like that described in connection with the apparatus shown in Fig. 1, except, in the case of Fig. 2, the output of a pair of amplifiers may be shown as a combination indication on the screen of the oscilloscope 70. If it be assumed that the output of the portion of the equipment embodying the rotary coils 49, 50 and the calibration coil 71 is not perfectly balanced, while the output of the portion involving the rotary coils 81, 85 and the calibration coil 103 is perfectly balanced, i. e. is substantially zero, the picture or pattern reflected by the oscilloscope will be a straight horizontal line. If, however, the output of either of said portions changes, the line on the oscilloscope screen may distort into an ellipse or assume a tilted angle, or take the shape of a tilted ellipse. The said distortion of the figure or pattern on the screen will be a function of the location of the magnetic mass or anomaly with respect to the position of the four rotating coils 49, 50, 81, 85. It should be added that the picture on the screen may be simplified by properly balancing the portion of the apparatus embodying the rotary coils 49, 50 and the calibration coil 71 as well as the portion embodying the rotary coils 81, 85 and the calibration coil 103; in which case the first oscilloscope screen pattern or figure will be merely a point which becomes distorted into a line or into an ellipse as previously described in the case where the first picture on the screen is a horizontal line. It will be clear that the interpretation by the operator of the oscilloscope screen patterns or figures is simpler when starting with a point than when starting with a line.

Mention should be made of the fact that it is not required, in the use of this form of the apparatus shown in Fig. 2, to record the output of both amplifiers as a combination indication on the oscilloscope screen; because it is quite possible to use independent continuous recording devices such, for instance, as a Brush direct inking oscillograph, in connection with each amplifier and thereby provide separate records obtained by the two portions of the apparatus which affect the two amplifiers.

In operation, the spacing of the rotating coils in the form of apparatus shown in Fig. 2 can ordinarily be greater than the spacing permissible in the form of apparatus shown in Fig. 1 chiefly because the form shown in Fig. 2 is arranged for horizontal positioning while that shown in Fig. 1 is arranged for vertical positioning. As in the case of the rotary coils of Fig. 1, the spacing of the rotary coils of Fig. 2 may be varied, and a practical spacing of the latter may be instanced as ten to twenty feet. Slight changes in the plane of rotation of the coils do not seriously affect the operation of either form of apparatus, and it is possible and practicable to eliminate any serious effect of greater changes by the use of suitable gyro-stabilized mountings. While separate motors have been shown in the two figures of the drawings, it will be clear that a single motor would be sufficient when using the apparatus, because either form could be connected to the said motor consecutively, or both forms of the apparatus could be connected thereto simultaneously.

It will be observed that the apparatus of Fig. 1 can be used for the investigation of one coordinate, the apparatus of Fig. 2 for the investigation of two coordinates perpendicular to each other; and that, by availing himself of both forms of apparatus, an operator can investigate three coordinates perpendicular to each other. Furthermore, as the apparatus operates on a differential or ratio basis, the effects of diurnal variations are eliminated and errors in coordinate placement are either neutralized or minimized.

In using the apparatus for geophysical exploration, it is preferable to have a common drive for the instruments 30, 31 of Fig. 1, and 55, 70, 108 of Fig. 2; and, if the apparatus is being transported as by airplane, it is advisable to provide instantaneously acting indicator lights, such as neon bulbs activated by suitable vacuum tube amplifier circuits, the design and operation of which are well known to those skilled in this art. Preferred means of transporting the apparatus are, as already indicated, air and water craft, and it may be added that an airplane of the helicopter type is highly desirable, especially in connection with geophysical prospecting, because of the adaptability of that type of plane to either slow or rapid horizontal flight, to vertical movement, and to holding of fixed positions.

While the apparatus herein shown and described has been set forth as useful chiefly in geophysical prospecting, it should be stated that the same has a much wider applicability and that its field of utility comprises the detecting and locating of magnetic masses or anomalies on or under either land or water including, for instance, the detection and location of deep mines which are normally fixed at a depth below the range of mine sweeping operations. In this connection one or more instruments such as shown and described herein could be enclosed in a housing, such as a watertight drum or tube, of any suitable non-magnetic construction capable of being towed on or below the surface of water and, during such towing, an observer aboard the tow boat could take note of the indications on the oscilloscope screen hereinabove set forth.

It will be understood that various changes may be resorted to in the form, construction, arrangement, and material of the apparatus, and in the steps of the method of procedure, without departing from the spirit and scope of this invention; and hence I do not intend to be limited to details herein shown and described except as they may be set forth in the claims or required by disclosures of the prior art.

What I claim is:

1. Apparatus of the character described comprising, a plurality of spaced rotatable coils, means for rotating the coils in unison, transformers having their primaries connected to the coils and mounted to rotate therewith, stationary secondaries for said transformers connected in series opposition, a potentiometer, a variometer connected with the potentiometer, means for connecting the outputs of the transformer secondaries to the potentiometer and variometer, an amplifier, means for connecting the potentiometer and the variometer to the amplifier, and means for detecting any differential in the said amplified outputs.

2. Apparatus of the character described comprising, a plurality of spaced rotatable coils, means for rotating the coils in unison, transformers having their primaries connected to the coils and mounted to rotate therewith, stationary secondaries for said transformers connected in series opposition, a potentiometer, a variometer connected with the potentiometer, means for connecting the outputs of the transformer secondaries to the potentiometer and variometer, an amplifier, means for connecting the potentiometer and the variometer to the amplifier, and means for detecting and recording any differential in the said amplified outputs.

3. Apparatus of the character described comprising, a plurality of spaced rotatable coils, means for rotating the coils in unison, transformers having their primaries connected to the coils and mounted to rotate therewith, stationary secondaries for said transformers connected in series opposition, a potentiometer, a variometer connected with the potentiometer, means for connecting the outputs of the transformer secondaries to the potentiometer and variometer, an amplifier, means for connecting the potentiometer and the variometer to the amplifier, a calibration coil in operative relationship with one of the rotatable coils, means for energizing and deenergizing the calibration coil, means for detecting any differential in the said amplified outputs, and means for measuring the said differential with reference to the value of the calibration coil when energized.

THEODORE ZUSCHLAG.

(References on following page)

REFERENCES CITED

The following references are of record in the file of this patent:

UNITED STATES PATENTS

| Number | Name | Date |
|---|---|---|
| 277,087 | Varley | May 8, 1883 |
| 1,954,975 | Zuschlag | Apr. 17, 1934 |
| 2,261,309 | Stuart | Nov. 4, 1941 |
| 2,288,876 | Arnold | July 7, 1942 |
| 2,291,692 | Cloud | Aug. 4, 1942 |
| 2,313,682 | Stuart | Mar. 9, 1943 |
| 2,359,894 | Brown et al. | Oct. 10, 1944 |
| 2,379,716 | Hull | July 3, 1945 |
| 2,382,743 | Penther et al. | Aug. 14, 1945 |
| 2,415,808 | Buckley | Feb. 18, 1947 |
| 2,420,580 | Antes | May 13, 1947 |
| 2,438,964 | Cunningham et al. | Apr. 6, 1948 |
| 2,440,503 | Fay | Apr. 27, 1948 |

FOREIGN PATENTS

| Number | Country | Date |
|---|---|---|
| 470,454 | Germany | July 14, 1925 |